United States Patent [19]

Ishikawa et al.

[11] Patent Number: 4,686,079
[45] Date of Patent: Aug. 11, 1987

[54] FUEL ASSEMBLY

[75] Inventors: Toshimitsu Ishikawa, Yokohama; Mishihiro Ozawa, Hitachi; Mikio Sakurai, Mito; Mutsuo Konno, Hitachi; Yasuhiro Aizawa, Hitachi; Takao Igarashi, Hitachi; Hiromasa Hirakawa, Hitachi, all of Japan

[73] Assignees: Hitachi, Ltd., Tokyo; Hitachi Engineering Co., Ltd., Ibaraki, both of Japan

[21] Appl. No.: 788,590

[22] Filed: Oct. 17, 1985

[30] Foreign Application Priority Data

Oct. 17, 1984 [JP] Japan ................................ 59-218110

[51] Int. Cl.$^4$ ................................................. G21C 3/32
[52] U.S. Cl. .................................... 376/444; 376/441; 376/440
[58] Field of Search ................ 376/444, 441, 442, 443, 376/440

[56] References Cited

U.S. PATENT DOCUMENTS

| 4,312,705 | 1/1982 | Steinke | 376/441 |
| 4,314,884 | 2/1982 | Fanning | 376/444 |
| 4,420,458 | 12/1983 | Dunlap | 376/440 |
| 4,508,679 | 4/1985 | Matzner | 376/444 |
| 4,544,522 | 10/1985 | Curulla | 376/444 |

Primary Examiner—Donald P. Walsh
Attorney, Agent, or Firm—Antonelli, Terry & Wands

[57] ABSTRACT

A fuel assembly has a fuel spacer consisting of a water rod having an outer diameter greater than that of fuel rods and a large number of circular sleeves into which the fuel rods are inserted. The fuel spacer has four bridge members. Both ends of these bridge members are fitted to two of eight circular sleeves which are adjacent one another in the diagonal direction of the fuel spacer. Both ends of each bridge member are bent so that its center projects outwardly away from the water rod.

11 Claims, 16 Drawing Figures

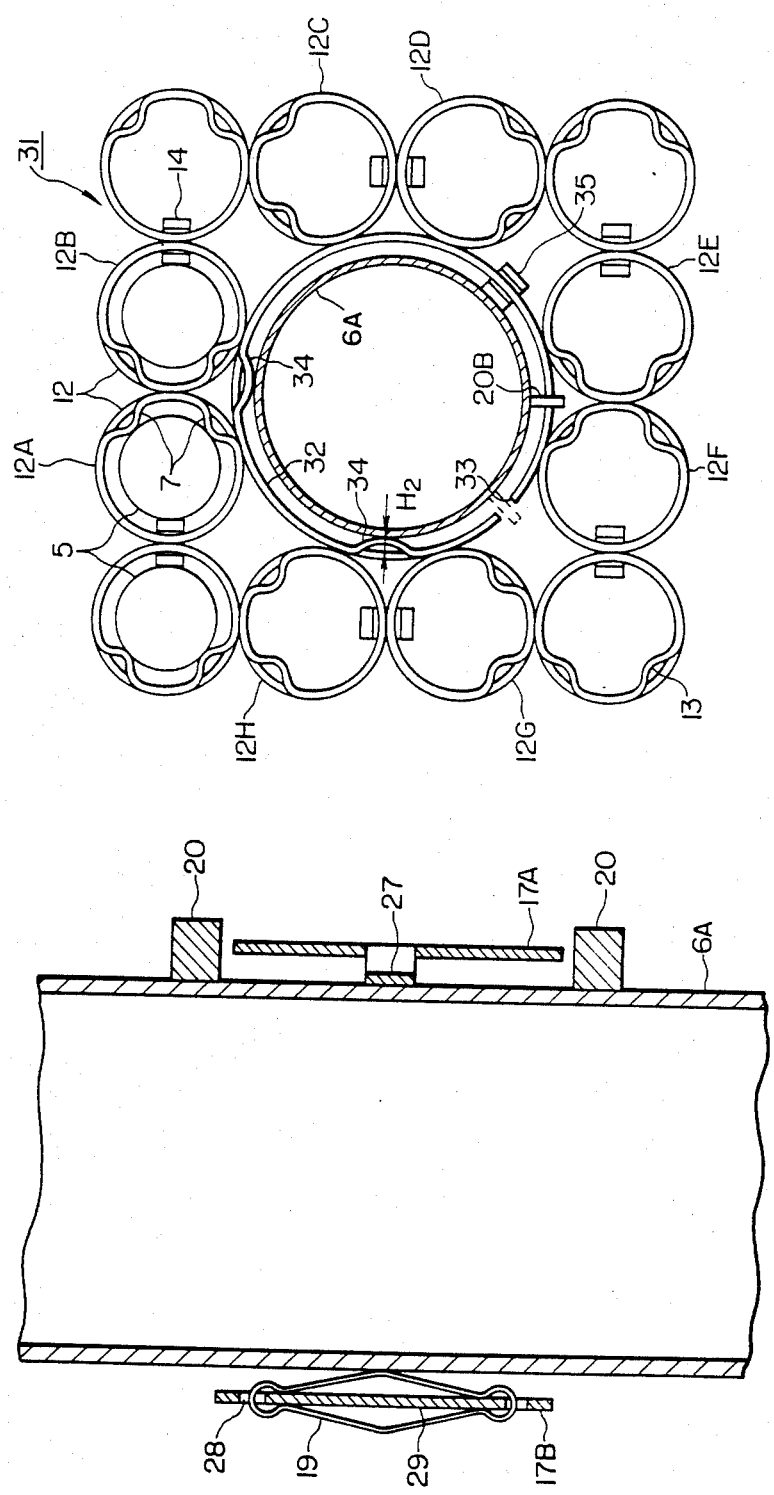

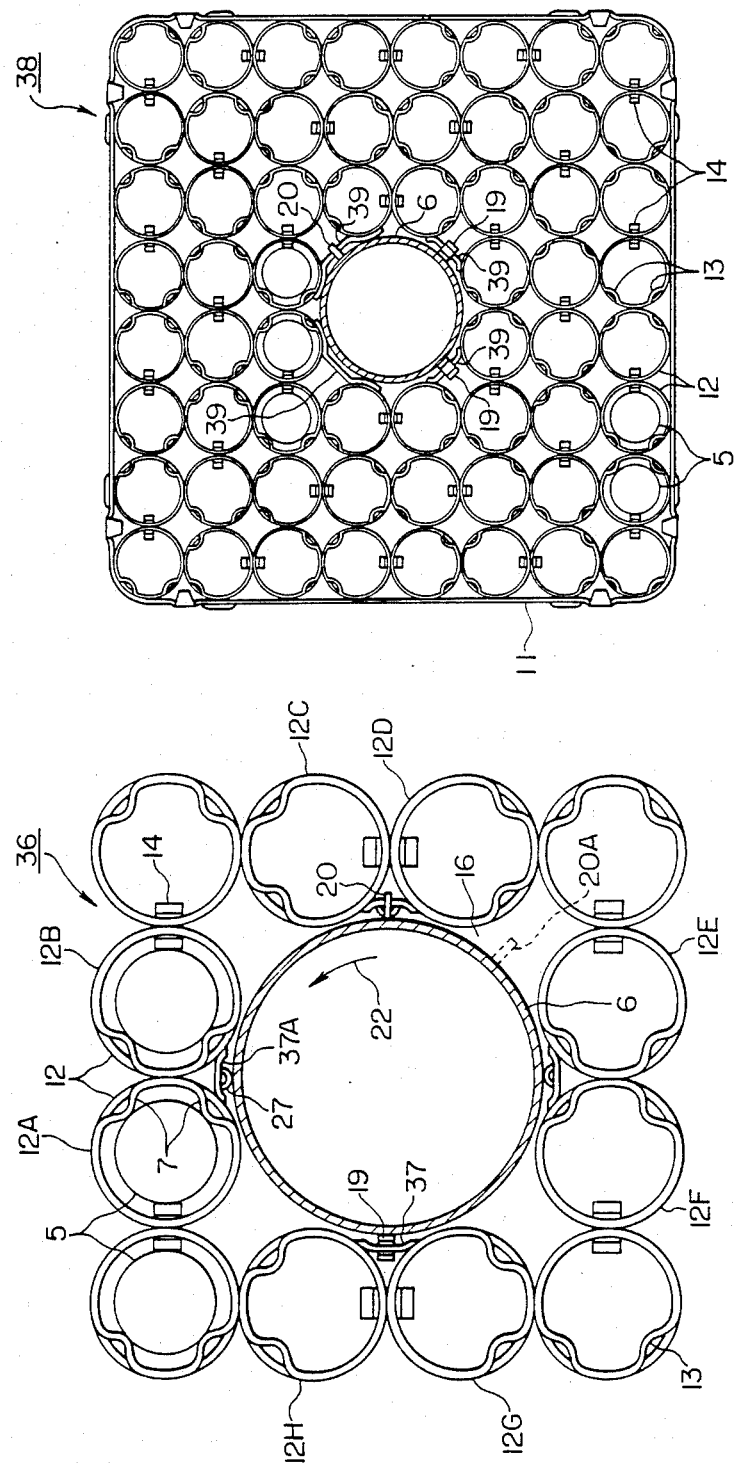

FUEL ASSEMBLY

BACKGROUND OF THE INVENTION

This invention relates to a fuel assembly, and more particularly to a fuel assembly having a fuel spacer consisting of a large number of circular members.

As a fuel assembly for use in a boiling water reactor, a fuel assembly is known which has a fuel spacer consisting of a large number of circular sleeves. This fuel assembly is disclosed in Japanese patent Laid-Open No. 65287/1984 (basic application: U.S. Patent application Ser. No. 410124 filed on Aug. 20, 1982), and is illustrated in FIG. 2 of the Japanese reference.

The fuel spacer is produced by arranging a large number of circular sleeves, into which fuel rods are inserted, in grid form and coupling adjacent circular sleeves with one another by welding. A water rod is also inserted into the circular sleeve in the same way as the, fuel rods. The support of the fuel spacer by the water rod is shown in FIGS. 8A-8C and 9A-9B of the Japanese reference.

Development of a fuel assembly, which includes a water rod having an increased outer diameter, has also been made. An example of such fuel assemblies is shown in FIG. 1 of Japanese patent Laid-Open No. 65792/1984. The outer diameter of the water rod in this fuel assembly is about twice the outer diameter of the fuel rod.

SUMMARY OF THE INVENTION

It is an object of the present invention to provide a fuel assembly with low pressure loss, which can increase a flow path area inside the water rod.

It is another object of the present invention to provide a fuel assembly which can reduce the danger of contact between the fuel rods and the water rod.

One of the characterizing features of the present invention resides in that the fuel spacer includes bridge members, whose both ends are fitted to two adjacent circular members among those circular members which are arranged close to a water rod having an outer diameter greater than that of fuel rods, in such a manner as to encompass the water rod, and projections disposed on the side surfaces of the water rod support the bridge members of the fuel spacer.

Another characterizing feature of the present invention is that both ends of each bridge member exist between the water rod and the circular members to which the bridge member is fitted.

BRIEF DESCRIPTION OF THE DRAWINGS

FIG. 7 is a sectional view taken along line VII—VII of FIG. 3;

FIG. 8 is an enlarged view of the center of the fuel spacer when the engagement structure between the fuel spacer and the water rod, shown in FIG. 2A in Japanese patent Laid-Open No. 65287/1984, is adapted to the fuel assembly having a water rod of an increased diameter;

FIG. 9 is an enlarged view of the center of the fuel spacer in accordance with another embodiment of the invention;

FIG. 10 is a plan view of the fuel spacer in accordance with still another embodiment of the invention;

DESCRIPTION OF THE PREFERRED EMBODIMENTS

Figure 1:
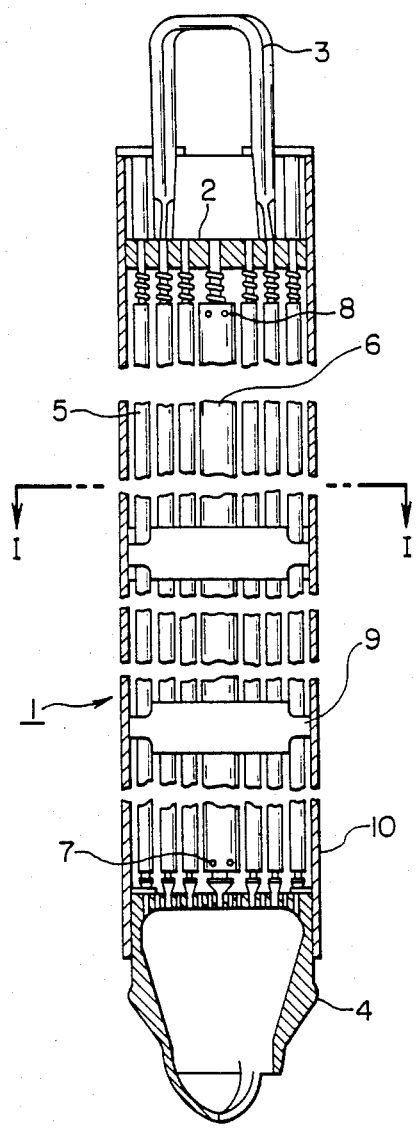
FIG. 1 is a longitudinal sectional view of a fuel assembly in accordance with a preferred embodiment of the present invention.

A fuel assembly suitable for use in a boiling water reactor in accordance with one embodiment of the present invention will now be described with reference to FIGS. 1 and 2.

The fuel assembly 1 consists of an upper tie plate 2 having a handle 3, a lower tie plate 4, a large number of fuel rods 5 whose both ends are held by the upper and lower tie plates 2 and 4, a water rod 6 disposed between the fuel rods 5 and a plurality of fuel spacers 9 disposed in the axial direction. A channel box 10 is mounted to the upper tie plate 2. The channel box 10 encompasses the bundle of fuel rods 5 that are bundled by the fuel spacers 9. Both ends of the water rod 6 are held by the upper and lower tie plates 2 and 4, too. However, the water rod 6 may be held only at its lower end by the lower tie plate 4. Cooling water inflow ports 7 are disposed at the lower end of the water rod 6 while cooling water outflow ports 8 are disposed at its upper end.

The cooling water rises inside the fuel assembly 1 loaded into the core from the lower portion of the core. That is, the cooling water flows into the lower tie plate 4 from the lower portion, rises in the flow paths between the fuel rods 5 inside the channel box 10 and flows out from the upper tie plate 2. Part of the cooling water flowing into the channel box 10 is supplied from the cooling water inflow port 7 into the water rod 6, then rises inside the water rod and flows out from the water rod from the cooling water outflow port 8. The water rod increase the proportion of the cooling water at the center on the cross-sectional plane of the fuel assembly 1 and increase the deceleration of neutrons at the center. For this reason, the degree of reaction at the center on the cross-sectional plane of the fuel assembly is improved, and the gradient of the output distribution can be made uniform on the cross-sectional plane.

Figure 2:
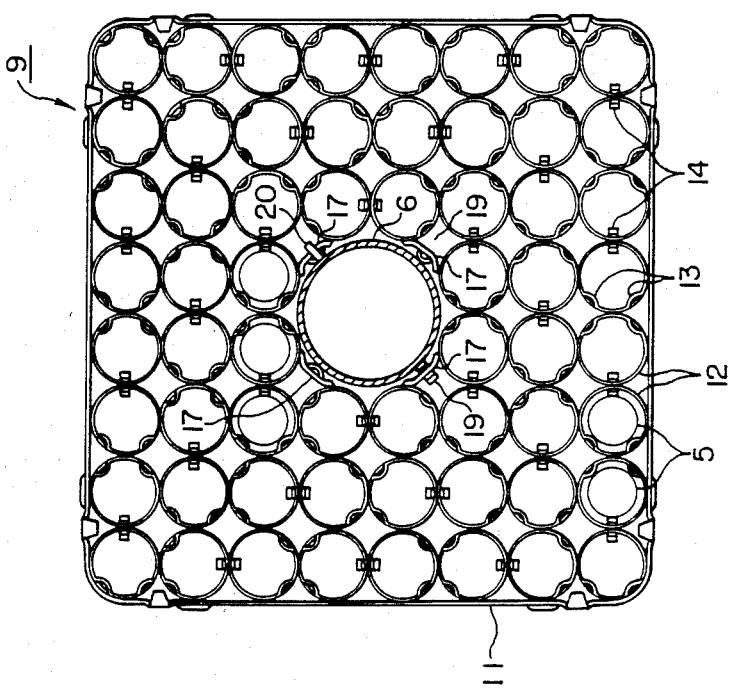
FIG. 2 is a plan view of the fuel spacer shown in FIG. 1.

The fuel spacer 9 is formed by arranging the same number of circular sleeves 12 as the number of fuel rods 5 in a grid form, and encompassing the outer periphery of the bundle of circular sleeves 12 by belt-like side bands 11, as shown in FIG. 2. Of the circular sleeves 12 arranged in the grid form, adjacent sleeves 12 are spot-welded to one another. Two each projections 13 are disposed at the upper and lower end portions of each circular sleeve 12, respectively, as shown in FIGS. 3A and 3B of the aforementioned Japanese patent Laid-Open No. 65287/1984. (The circular sleeve 12 is referred to as a "ferrule".) These projections are formed by projecting inward a part of each circular sleeve 12. A continuous loop spring 14 is disposed between two adjacent circular sleeves 12. This spring 14 has the same shape as the spring shown in Japanese patent Laid-Open No. 65287/1984, and its center in the direction of height projects outward. This continuous loop spring 14 is fitted to the circular sleeves 12 in the same way as in Japanese patent Laid-Open No. 65287/1984.

Figure 3:
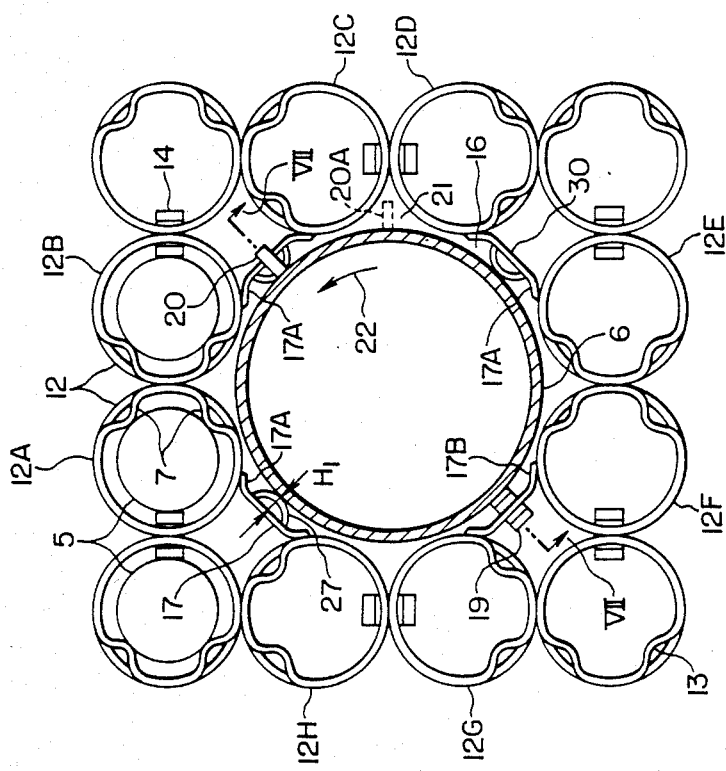
FIG. 3 is an enlarged view of the center of the fuel spacer shown in FIG. 2.

The structure at the center of the fuel spacer 9 will now be explained with reference to FIG. 3. A hole 16 is formed at the center of the fuel spacer. This hole 16 is formed by removing four circular sleeves at the center of the fuel spacer shown in FIG. 2A of Japanese patent Laid-Open No. 65287/1984, and is encompassed by the side walls of twelve circular sleeves at the center. Four bridge members 17 are disposed inside the hole 16 in a direction crossing at right angles the diagonal of the fuel spacer 9 as shown in FIGS. 1 and 3. Both right and left end portions of each bridge member 17 are spot-welded to the side surfaces of two circular sleeves 12 that are adjacent to each other among the twelve circular sleeves that define the hole 16. The bridge members 17 are two kinds, i.e., 17A and 17B, depending upon their shapes as will be described later. The water rod 6 is inserted into the hole 16 which is encompassed by the side surfaces of the four bridge members 17 (more definitely, three bridge members 17A and one bridge member 17B) and by the side surfaces of the eight circular sleeves 12 (more definitely, the circular sleeves 12A through 12H shown in FIG. 3).

Figure 4:
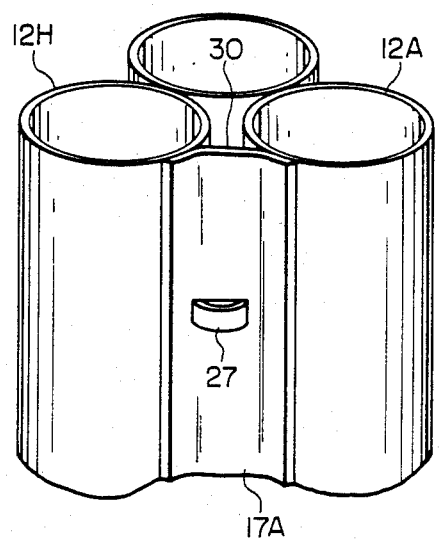
FIG. 4 is a perspective view of a bridge member 17A shown in FIG. 3.

FIG. 4 shows the structure of the bridge member 17A of the bridge members 17. The bridge member 17A consists of a single plate, whose both right and left end portions are bent into a curve. The right and left end portions of this bridge member 17A are welded to the two circular sleeves 12A and 12H. Similarly, the right and left end portions of the other bridge members 17A are welded to the circular sleeves 12B and 12C and to the circular sleeves 12D and 12E, respectively. Each bridge member 17A has a projection 27 that projects in the bending direction of both right and left end portions. The projection 27 is formed by projecting a part of the bridge member 17A as shown in FIG. 4, and comes into contact with the outer surface of the water rod 6.

Figure 5:
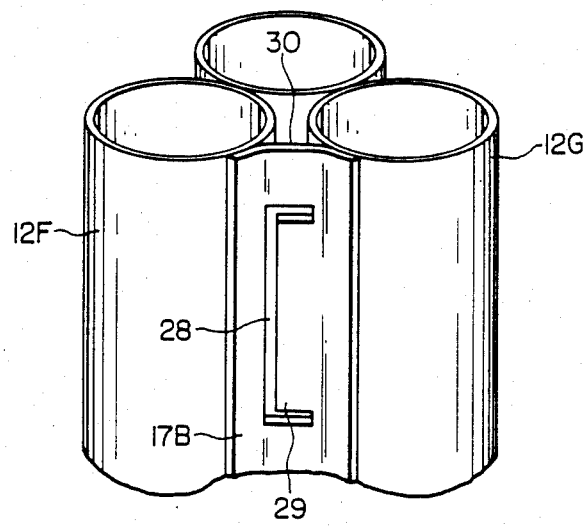
FIG. 5 is a perspective view of a bridge member 17B shown in FIG. 3.
Figure 6:
FIG. 6 is a perspective view of a continuous loop spring shown in FIG. 3.

FIG. 5 shows the structure of the bridge member 17B as the other member of the bridge members 17. The bridge member is bent at its right and left end portions in the same direction, in the same way as the bridge member 17A. A C-shaped throughhole 28 is bored at the center of the bridge member 17B. Since this through-hole 28 is formed, the bridge member 17B has a projection 29. The continuous loop spring 19 shown in FIG. 6 is fitted to the projection 29, though not shown in FIG. 5.

The right and left end surfaces of the bridge members 17A and 17B are positioned further outward than a circle that is inscribed to the outer surfaces of the circular sleeves 12A through 12H in FIG. 3. The base portions 30 of the bridge members 17A and 17B are positioned further outward than the inscribed circle described above. This is obvious from the fact that the right and left end surfaces of the bent bridge members 17A and 17B are positioned closer to the inscribed circle than the base portions 30.

The water rod 6 is inserted into the hole 16 as shown in FIG. 3, and is clamped in the horizontal direction by the projections 27 of the bridge members 17A and the continuous loop springs 19 disposed on the bridge member 17B.

Plural pairs of projections 20 are fitted at predetermined positions on the side surface of the water rod in its circumferential direction, spaced apart from each other. The gap between each pair of projections in the axial direction is somewhat greater than the height of the circular sleeve 12. Each pair of projections 20 are positioned in such a manner as to clamp the bridge member 17A between them as shown in FIG. 7. The projections 20, particularly the lower projection 20, prevents the bridge member 17A, that is, the fuel spacer 9 from falling off. In this manner, the water rod 6 keeps the fuel spacer 9 at a predetermined position in the axial direction of the fuel assembly by means of the projections 20.

The fuel spacer 9 is fitted to the water rod 6 on the basis of FIG. 3. First of all, the projections 20 of the water rod 6 inserted into the hole 16 of the fuel spacer 9 are brought into agreement with the position of the dashed line portion 20A in FIG. 3 (that is, the gap 21 defined between the side surfaces of the two adjacent circular sleeves 12). Then, the fuel spacer 9 is moved in the axial direction of the water rod 6 so that one of the pair of projections 20 passes through the gap 21. When one of the pair of projections 20 passes through the gap 21, that is, when the pair of projections 20 come to clamp the circular sleeve 12 between them, the water rod 6 is rotated by 45° in the direction represented by an arrow 22. When this operation is completed, the state shown in FIG. 7 is attained and the fuel spacer 9 is held by the water rod 6.

In this embodiment, the bridge members 17A and 17B are alternately disposed in the gaps formed between the two adjacent circular sleeves 12 that come into contact with the hole 16, and moreover both end portions of the bridge members 17A and 17B are fitted to the two adjacent circular sleeves 12. Therefore, the projection area of the fuel spacer 9 from above and its wetted area can be reduced, so that the pressure loss of the fuel spacer 9 is reduced and the pressure loss of the fuel assembly 1 is reduced as much.

In addition, the bridge members 17A and 17B are fitted to the circular sleeves 12A through 12H in such a fashion that the base portions 30 of these bridge members 17A and 17B are positioned further outward than the circle which is inscribed on the outer surfaces of the circular sleeves 12A –12H (the circular sleeve 12 coming into contact with the hole 16). For this reason, the outer diameter of the water rod 6 can be increased. This means that the cross-sectional area of the cooling water flow path inside the water rod 6 can be increased, and a ratio of the number of hydrogen atoms to the number of uranium atoms at the center on the cross-sectional plane of the fuel assembly can be improved. This results in the activation of nuclear fission at the center on the cross-sectional plane of the fuel assembly, and in the flattening of the output distribution on the cross-sectional plane. Therefore, the fuel economy of the fuel assembly can be improved. In the boiling water reactor, water regions exist between the fuel assemblies inside the core and the ratio of the number of hydrogen atoms to the number of uranium atoms is greater in the peripheral portion of the fuel assemblies than at the center on the cross-sectional plane of the fuel assemblies. The present embodiment solves this problem as described above.

In the structure shown in FIG. 3, the outer surface of the water rod 6 is spaced apart from the outer surfaces of the circular sleeves 12A through 12H. However, this embodiment can bring them into contact with one another. In other words, if the positons of disposition of the bridge members 17A and 17B are moved further outward from the center of the water rod 6, the outer diameter of the water rod 6 can be increased until the outer surface of the water rod 6 comes into contact with the outer surfaces of the circular sleeves 12A through 12H. In this case, the outer diameter of the water rod 6 is the greatest, and the effect of improving the ratio of the number of hydrogen atoms to the number of uranium atoms is maximal The effect of this embodiment described above becomes more obvious when compared with a fuel assembly having fuel spacers 31 shown in FIG. 8. This drawing shows the center of the fuel spacer 31 which is the same region as one shown in FIG. 3. This fuel spacer 31 is the adaptation of the joint structure with the water rod in the fuel spacer, shown in FIG. 2A of Japanese patent Laid-Open No. 65287/1984, to the fuel spacer of a fuel assembly having an increased diameter water rod. In other words, the fuel spacer 31 is produced by arranging a large number of circular sleeves 12 in grid from in the same way as the fuel spacer 9, and four circular sleeves 12 at the center are removed to define a circular space. The circular sleeve 32 is disposed in this space. The circular sleeve 32 is in contact with the circular sleeves 12A through 12H, and is moreover fitted to these sleeves. The circular sleeve 32 has a groove 33 that extends in the axial direction, as shown in FIG. 8B of Japanese patent Laid-Open No. 65287/1984. This groove 33 cuts off the circular sleeve 32 in the circumferential direction. The circular sleeve 33 includes the two projections 34 projecting inward and the continuous loop spring 35 in the same way as the circular sleeve 12. The water rod 6A having the projection 20B is fitted into the circular sleeve 32 and is clamped in the horizontal direction by the two projections 34 and the continuous loop spring 35. The water rod 6A is fitted to the circular sleeve 32 in the manner shown in FIGS. 8A and 8B of Japanese patent Laid-Open No. 65287/1984.

As can be seen clearly from the comparison of the fuel spacer 9 with the fuel spacer 31, the projection area of the fuel spacer 9 from above and its wetted area are smaller than those of the fuel spacer 31 having the circular sleeve 32 which is substantially circular. Therefore, the fuel assembly using the fuel spacer 9 exhibits a smaller pressure loss than the fuel assembly using the fuel spacer 31.

Next, the effect of improving the ratio of the number of hydrogen atoms to the number of uranium atoms will be compared between the fuel assembly using the fuel spacer 9 and the fuel assembly using the fuel spacer 31. The outer diameter of the water rod 6 inserted into the fuel spacer 31 is limited only by the height $H_2$ of the projection 34 (the projection height projecting inward from the inner surface of the circular sleeve 32) because the projection 34 is disposed on the circular sleeve 32 that is inscribed to the circular sleeve 12A through 12H. However, the outer diameter of the water rod 6 inserted into the fuel spacer 9 is not limited only by the height $H_1$ (the height projecting from the surface of the base portion 30 of the bridge member 17A facing the water rod 6) of the projection 27 disposed on the bridge member 17A. The case where the height $H_1$ of the projection 27 is equal to the height $H_2$ of the projection 34 will be described. If the bridge members 17A and 17B are disposed further outward than the inscribed circle of the circular sleeves 12A through 12H, that is, the outer surface of the circular sleeve 32, the outer diameter of the water rod 6 can be made greater than the outer diameter of the water rod 6A.

Since the bridge member can be formed by a press, it can be produced easily, and since it can be easily fitted to the circular sleeve 12, the fuel spacer 9 can be produced easily. The gap 21 defined by coupling two cylindrical sleeves 12 can be utilized for the movement of the projection 20, so that the fuel spacer 9 can be fitted easily to the water rod 6.

Another example of the fuel spacer is shown in FIG. 9. The drawing shows the portion corresponding to the one shown in FIG. 3. In the fuel spacer 36 of this embodiment, the fitting positions of the bridge members 37 are different from those of the bridge members 17 of the fuel spacer 9. The fuel spacer 9 has four bridge members 37. These bridge members are fitted respectively to the two sleeves of the circular sleeves that are divided into the groups consisting of the cylindrical sleeves 12A and 12B, 12C and 12D, 12E and 12F, and 12G and 12H. In other words, each bridge member 37 is disposed in parallel with one side of the side band 11. The other structure of the fuel spacer 36 is the same as that of the fuel spacer 9. The bridge members 37 are two kinds in the same way as those of the fuel spacer 9; that is, the bridge members 37A and 37B. The bridge members 37A are substantially the same as the bridge members 17A except that the width of the bridge members 17A is reduced. Each bridge member 37A has a projection 27. The bridge member 37B has substantially the same structure as the bridge member 17B except that the width of the bridge member 17B is reduced. The bridge member 37B has a continuous loop spring 19.

The fuel assembly having the fuel spacers 36 can provide the same effect as the fuel assembly of the embodiment described already. Since the width of the bridge members 37 of the fuel spacer 36 is smaller than that of the bridge members 17 of the fuel spacer 9, the projection area from above and the wetted area of the fuel spacer 36 are smaller than those of the fuel spacer 9. Therefore, the pressure loss of the fuel assembly having the fuel spacers 36 can be further reduced from the pressure loss of the fuel assembly shown in FIG. 1.

The fuel assembly in accordance with still another embodiment of the present invention will now be described. The fuel assembly in this embodiment has the same structure as that of the fuel assembly 1 shown in FIG. 1 except for their fuel spacers. The fuel spacer 38 of this embodiment is shown in FIG. 10. The structure of the fuel spacer 38 is mostly the same as that of the fuel spacer 9. The central structure of the fuel spacer 38 which is different from the fuel spacer 9 will be explained with reference to FIG. 11. The fuel spacer 38 has the bridge members 39, too. Each bridge member 39 is fitted to the two circular sleeves 12 adjacent each other in the same way as in the fuel spacer 9.

Figure 11:
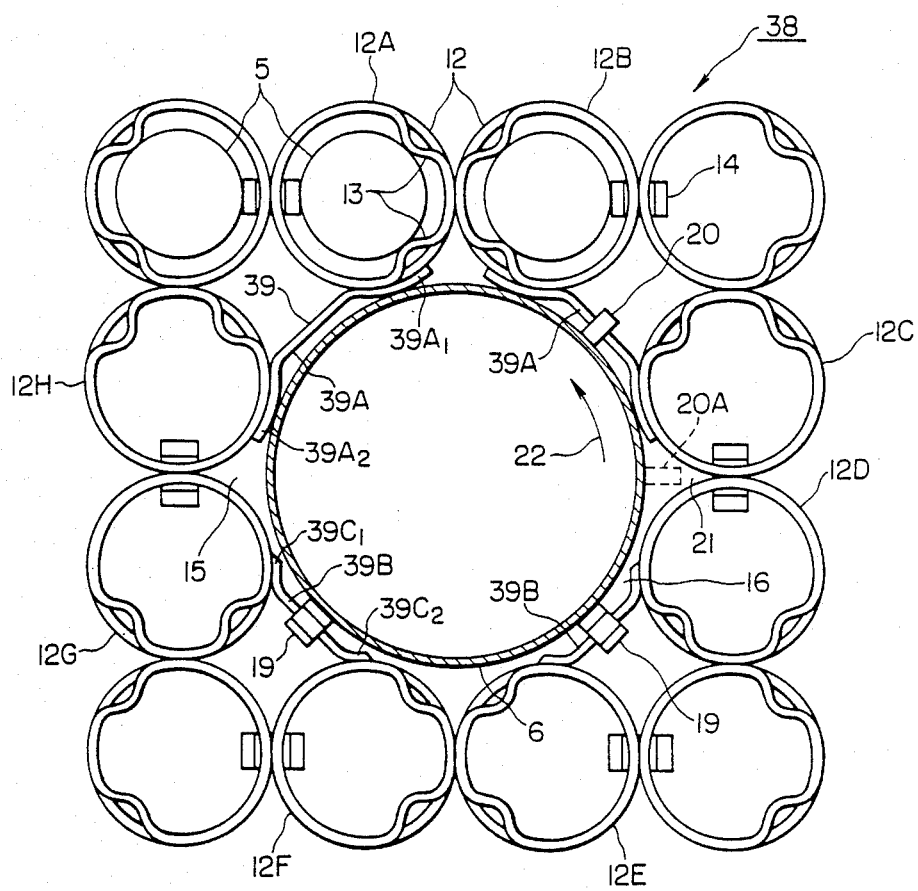
FIG. 11 is an enlarged view of the fuel spacer shown in FIG. 10.
Figure 12:
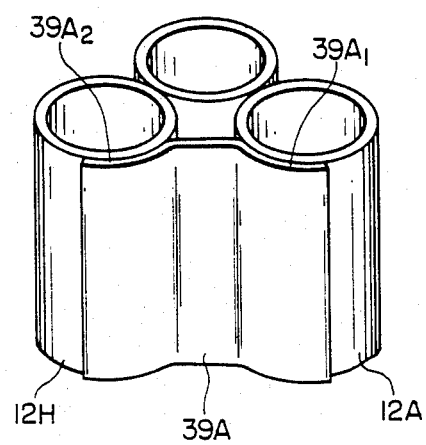
FIG. 12 is a perspective view of the bridge member 17A shown in FIG. 11.

FIG. 12 shows the structure of the bridge member 39A of the bridge members 39. The bridge member 39A consists of a single plate, and both right and left end portions $39A_1$ and $39A_2$ of the plate are bent with a curvature. The radius of curvature of these end portions 39A₁ and 39A₂ is the same as that of the circular sleeve 12. The right and left end portions 39A₁ and 39A₂ of the bridge member 39A are spot-welded to the side surfaces of the circular sleeves 12A and 12H (and the circular sleeves 12B and 12C) that face the water rod 6, respectively. As shown in FIG. 11, the end portions 39A₁ and 39A₂ of the bridge member 39A are interposed between the circular sleeve 12, to which the bridge member 39 is fitted, and the water rod 6, and are kept in contact with the water rod 6.

Figure 13:
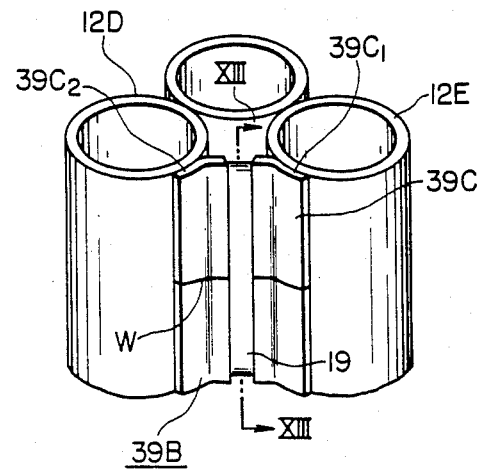
FIG. 13 is a perspective view of the bridge member 17B shown in FIG. 11.
Figure 14:
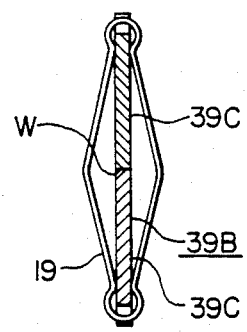
FIG. 14 is a sectional view taken along line XIII—XIII of FIG. 13.
Figure 15:
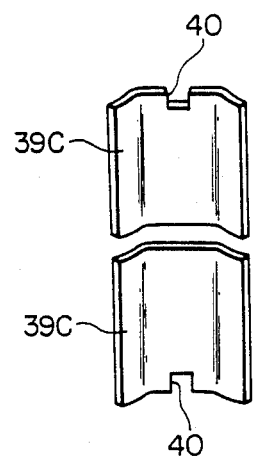
FIG. 15 is an exploded view of the bridge member shown in FIG. 13.

The structure of the other bridge member 39B of the bridge members 39 is shown in FIG. 13. The bridge member 39B is formed by disposing vertically two bridge members 39C and welding them together at their weld portions. FIG. 14 is a longitudinal sectional view of the bridge member 39B. FIG. 15 shows the bridge member 39C constituting the bridge member 39B. Both right and left end portions 39C₁ and 39C₂ of the bridge member 39C are bent with a curvature in the same way as the bridge member 39A. The bridge member 39C has a recess 40. The bridge member 39B has recesses 40 at its upper and lower end portions. The end portions 39C₁ and 39C₂ of the bridge member 39C, that are disposed vertically, are spot-welded to the side surfaces of the circular sleeves 12D and 12E (and the circular sleeves 12F and 12G) that face the water rod 6. In FIG. 11, it is possible to interpose the end portions 39C₁ and 39C₂ of the bridge member 39B between the circular sleeve 12 and the water rod 6.

The continuous loop spring 19 shown in FIG. 6 is fitted to the bridge member 39B. Both upper and lower end portions of the continuous loop spring 19 mesh with the recesses 40 at the upper and lower end portions of the bridge member 39B, respectively. For this reason, the continuous loop spring is not subjected to transverse deflection.

In this embodiment, the end portions 39A₁ and 39A₂ of the bridge member 39A are interposed between the water rod 6 and the circular sleeve 12 adjacent the water rod 6 (e.g., the circular sleeves 12A-12H) and the water rod 6 can not move close to the circular sleeve 12 from the surfaces of the end portions 39A₁ and 39A₂. Therefore, the gap between the fuel rod 5 and the water rod 6 becomes large, so that the possibility of the fuel rod 5 coming into contact with the water rod 6 during the use of the fuel assembly (under the state in which the fuel assembly is loaded into the core and the reactor is in operation) is very slight. In the fuel assembly 1 shown in FIG. 1, the outer diameter of the water rod 6 can be made equal to the diameter of the inscribed circle of the circular sleeves 12A-12H. In this case, however, there is the risk of the fuel rod 5 coming into contact with the water rod 6 during the use of the fuel assembly. This embodiment eliminates such a risk. In the fuel assembly 1, too, the risk of contact described above can be eliminated by somewhat increasing the height H₁ of the projection 27 of the bridge member 17A.

This embodiment can make the outer diameter of the water rod 6 greater than the outer diameter of the water rod 6A shown in FIG. 8 in the same way as in the fuel assembly 1 described above. This embodiment can provide the same effect as the foregoing embodiments besides the effect described above.

Figure 16:
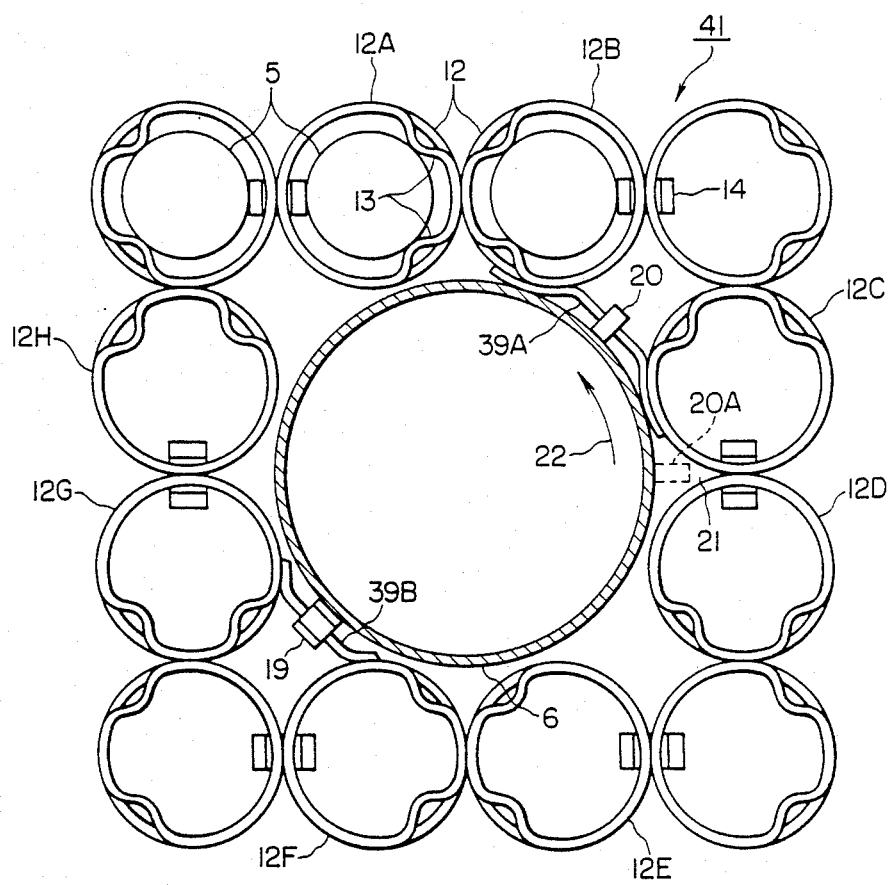
FIG. 16 is an enlarged view of the center of the fuel spacer in accordance with still another embodiment of the invention.

FIG. 16 shows a fuel spacer 41 in accordance with still another embodiment of the present invention. In this fuel spacer 41, one each bridge member 39A and 39B disposed diagonally to face each other are removed from the fuel spacer 38. The fuel assembly using this fuel spacer 41 can provide the same effect as the fuel assembly using the fuel spacers 38.

What is claimed is:

1. A fuel assembly comprising:
an upper tie plate;
a lower tie plate;
a plurality of fuel rods, each having both ends thereof held by said upper and lower tie plates;
a water rod disposded between said fuel rods, said water rod having the lower end thereof held by said lower tie plate and having an outer diameter greater than that of respective ones of said fuel rods; and
a fuel spacer having a large number of circular members for the insertion of said fuel rods, and having a plurality of bridge members having both ends thereof fitted respectivley to two of said circular members adjacent one antother and also adjacent said water rod;
said bridge members being held by projections formed on side surfaces of said water rod.

2. The fuel assembly as defined in claim 1 wherein a flexible member coming into contact with said water rod is disposed on at least one of said bridge members.

3. The fuel assembly as defined in claim 2 wherein said flexible member is a loop spring.

4. The fuel assembly as defined in claim 1 wherein said bridge members are disposed on the diagonals of a rectangular fuel spacer and their both ends are fitted to said two adjacent circular members.

5. The fuel assembly as defined in claim 4 wherein both ends of said bridge member are bent in such a fashion that the center of said bridge member projects outwardly away from said water rod, and are fitted to said circular members.

6. The fuel assembly as defined in claim 5 wherein part of said bridge members has said projection coming into contact with said water rod and the other of said bridge members have said flexible member coming into contact with said water rod.

7. The fuel assembly as defined in claim 1 wherein said bridge members are disposed in parallel with the side surface of said fuel spacer, and both ends of said bridge member are fitted to said two adjacent circular members.

8. The fuel assembly as defined in claim 7 wherein both ends of said bridge member are bent in such a manner that its center projects outwardly way from said water rod, and are fitted to said circular members.

9. The fuel assembly as defined in claim 8 wherein part of said bridge members has projections coming into contact with said water rod, and the other of said bridge members have said flexible members coming into contact with said water rod.

10. The fuel assembly as defined in claim 1 wherein both ends of said bridge member are interposed between said water rod and said circular members to which said bridge member is fitted.

11. The fuel assembly as defined in claim 1, whereing said water rod has an outer diameter greater than the outer diameter of respective ones of said circular members, a plurality of said bridge members being arranged adjacent said water rod.

* * * * *